No. 792,458. Patented June 13, 1905.

UNITED STATES PATENT OFFICE.

RASSELAS PATTERSON REYNOLDS, OF WALLA WALLA, WASHINGTON.

TIMBER PRESERVATIVE.

SPECIFICATION forming part of Letters Patent No. 792,458, dated June 13, 1905.

Application filed December 2, 1903. Serial No. 183,494.

*To all whom it may concern:*

Be it known that I, RASSELAS PATTERSON REYNOLDS, a citizen of the United States, and a resident of Walla Walla, in the county of Walla-walla and State of Washington, have invented a new and Improved Timber Preservative, of which the following is a full, clear, and exact description.

The object of the invention is to provide a new and improved timber preservative or coating for rendering the timber proof against decay when used above or under ground.

The composition consists of the following ingredients, in about the proportions specified, namely: coal-tar, eight parts; Portland cement, one part; asbestos, (flour,) one part; sulfur, one part; resin, one part; creosote, refined, one ounce, or four ounces crude creosote.

The above-mentioned ingredients are thoroughly boiled in a caldron or vat for about ten minutes after the boiling-point is reached, and then the timber is immersed for, say, about five minutes in the boiling mass to form a coating on the timber. The coated timber is then removed and the coating allowed to dry and harden before using the timber.

By employing sulfur and resin a very efficient medium for holding the cement and asbestos diffused in the mass is obtained to permit all the ingredients to assimilate more readily and permanently to form a coating containing the ingredients well mixed in all its parts.

It is understood that the proportion of the several ingredients as above given is varied according to the use made of the treated timber. For instance, when the timber is to be used for ordinary underground purposes then the amount of the coal-tar may be about doubled.

Having thus described my invention, I claim as new and desire to secure by Letters Patent—

1. The herein-described timber preservative, consisting of coal-tar, Portland cement, asbestos, creosote, and a medium for holding the cement and asbestos diffused in the mass, as set forth.

2. The herein-described timber preservative, consisting of coal-tar, Portland cement, asbestos, sulfur, resin, and creosote in about the proportions specified.

In testimony whereof I have signed my name to this specification in the presence of two subscribing witnesses.

RASSELAS PATTERSON REYNOLDS.

Witnesses:
STEPHEN B. L. PENROSE,
ALLEN H. REYNOLDS.